US009791646B2

(12) United States Patent
Okada (10) Patent No.: US 9,791,646 B2
(45) Date of Patent: Oct. 17, 2017

(54) OPTICAL MODULE HAVING LATCHING MECHANISM OF COVER WITH BUSH (71) Applicant: Sumitomo Electric Device Innovations, Inc., Yokohama-shi (JP)

(72) Inventor: Takeshi Okada, Yokohama (JP)

(73) Assignee: Sumitomo Electric Device Innovations, Inc., Yokohama-shi (JP)

( * ) Notice: Subject to any disclaimer, the term of this patent is extended or adjusted under 35 U.S.C. 154(b) by 28 days.

(21) Appl. No.: 14/389,700

(22) PCT Filed: May 22, 2013

(86) PCT No.: PCT/JP2013/064816
§ 371 (c)(1),
(2) Date: Sep. 30, 2014

(87) PCT Pub. No.: WO2013/176290
PCT Pub. Date: Nov. 28, 2013

(65) Prior Publication Data
US 2015/0063762 A1   Mar. 5, 2015

(30) Foreign Application Priority Data
May 24, 2012 (JP) .................................. 2012-118769

(51) Int. Cl.
G02B 6/42   (2006.01)
(52) U.S. Cl.
CPC ........... *G02B 6/4263* (2013.01); *G02B 6/421* (2013.01); *G02B 6/4277* (2013.01); *G02B 6/4292* (2013.01)
(58) Field of Classification Search
CPC .................................................. G02B 6/4263
See application file for complete search history.

(56) References Cited

U.S. PATENT DOCUMENTS 5,790,733 A * 8/1998 Smith .................. G02B 6/4249
385/59
7,651,278 B2 * 1/2010 Kiani ................... G02B 6/3825
385/71
(Continued)

FOREIGN PATENT DOCUMENTS

CN      102200614 A    9/2011
JP      2001-066468 A  3/2001
(Continued)

OTHER PUBLICATIONS

Hakozaki et al., Machine Translation of JP 2012-078468 A, Apr. 2012.*
(Continued)

*Primary Examiner* — Michelle R Connelly
(74) *Attorney, Agent, or Firm* — Venable LLP; Michael A. Sartori; Laura G. Remus (57) ABSTRACT An optical module with an improved coupling portion to couple an optical device with an external fiber is disclosed. The coupling portion includes a stub to secure a coupling fiber in a center thereof, a bush to support the stub, a sleeve to receive the stub in a portion thereof and an external ferrule in another portion, and a sleeve cover to cover the sleeve. The coupling portion further includes a latch put between the bush and the cover by being hooked with both the bush and the cover. The latch electrically isolates the bush from the cover even when the bush and the sleeve cover are made of metal.

15 Claims, 9 Drawing Sheets (56) References Cited

U.S. PATENT DOCUMENTS

| | | | |
|---|---|---|---|
| 9,322,998 B2* | 4/2016 | Miller | G02B 6/3854 |
| 2005/0036745 A1 | 2/2005 | Nakanishi et al. | |
| 2005/0286839 A1 | 12/2005 | Yoshikawa | |
| 2010/0172617 A1* | 7/2010 | Sato | G02B 6/421 |
| | | | 385/88 |
| 2010/0284662 A1* | 11/2010 | Reagan | G02B 6/4441 |
| | | | 385/135 |
| 2013/0034329 A1* | 2/2013 | Tucker | G02B 6/428 |
| | | | 385/94 |

FOREIGN PATENT DOCUMENTS

| | | | |
|---|---|---|---|
| JP | 2010-181867 A | | 8/2010 |
| JP | 2012-078468 A | | 4/2012 |
| JP | 2012078468 A | * | 4/2012 |

OTHER PUBLICATIONS

Notification of the First Office Action in Chinese Patent Application No. 201380027180.6, dated Jun. 24, 2015.
International Search Report and Written Opinion in PCT International Application No. PCT/JP2013/064816, dated Aug. 29, 2013.

* cited by examiner

OPTICAL MODULE HAVING LATCHING MECHANISM OF COVER WITH BUSH

TECHNICAL FIELD

Various embodiments of the present application relate to an optical module. In particular, various embodiments relate to a mechanism to lath a cover for a sleeve with a bush to secure a stub.

BACKGROUND ART

An optical transceiver installed within an optical communication system includes an optical module that has a light-emitting device or a light-receiving device coupled with an external optical fiber in the optical communication system. In order to couple the optical device above with the external optical fiber, a coupling portion is prepared in the optical module, and the coupling portion includes, for a light-emitting module, a stub securing a coupling fiber therein and a sleeve. The optical device is optically coupled with the coupling fiber, while, the external fiber with a ferrule in an end thereof also is coupled with the coupling fiber by inserting the ferrule into the sleeve and making the ferrule abut against the coupling fiber. Thus, the external fiber is optically coupled with the optical device.

The optical device, which electrically couples with circuits in the optical transceiver, such as a driver for driving the light-emitting device or a pre-amplifier for amplifying a faint signal converted by the light-receiving device, is necessary to be grounded to, what is called as the signal ground. On the other hand, a housing of the optical transceiver is unavoidably grounded to, what is called as the frame or chassis ground. The latter ground, the frame or chassis ground, is strongly influenced by ambient electrical conditions, in other words, the electro-magnetic interference (EMI). Accordingly, the signal ground is strongly preferable to be isolated from the frame or chassis ground. In the optical module, a cover that secures the sleeve is grounded to the frame or chassis ground, while, a bush that secures the stub is grounded to the signal ground. Accordingly, a mechanism or a structure to isolate the cover from the bush electrically is inevitable in the optical module.

SUMMARY OF INVENTION

An aspect of the present application relates to an optical module. The optical module includes an optical device, a stub, a metal bush, a sleeve, a metal sleeve cover, and a latch. The stub has a coupling fiber that optically couples with the optical device. The metal bush receives the first portion of the stub. The sleeve receives the second portion of the stub. The metal cover covers the sleeve. The sleeve receives an external optical fiber. Thus, the external optical fiber optically couples with the optical device by interposing the coupling fiber in the stub. A feature of the optical module according an embodiment is that the latch, which is made of electrically insulating material, typically resin, is put between the metal sleeve cover and the metal bush. Moreover, the latch is hooked with the bush, and also with the metal sleeve cover. Thus, the optical device, which is grounded to, what is called as the signal ground, may be electrically isolated from the metal sleeve cover which is grounded to, what is called as the frame or chassis ground, only by hooking the latch with the bush and the metal sleeve cover.

BRIEF DESCRIPTION OF DRAWINGS

The foregoing and other purposes, aspects and advantages will be better understood from the following detailed description of embodiments of the invention with reference to the drawings, in which.

DESCRIPTION OF EMBODIMENTS

Next, various embodiments according to the present invention will be described. In the description of drawings, numerals or symbols same as or similar to each other will refer to elements same as or similar to each other without overlapping explanations.

Figure 1:
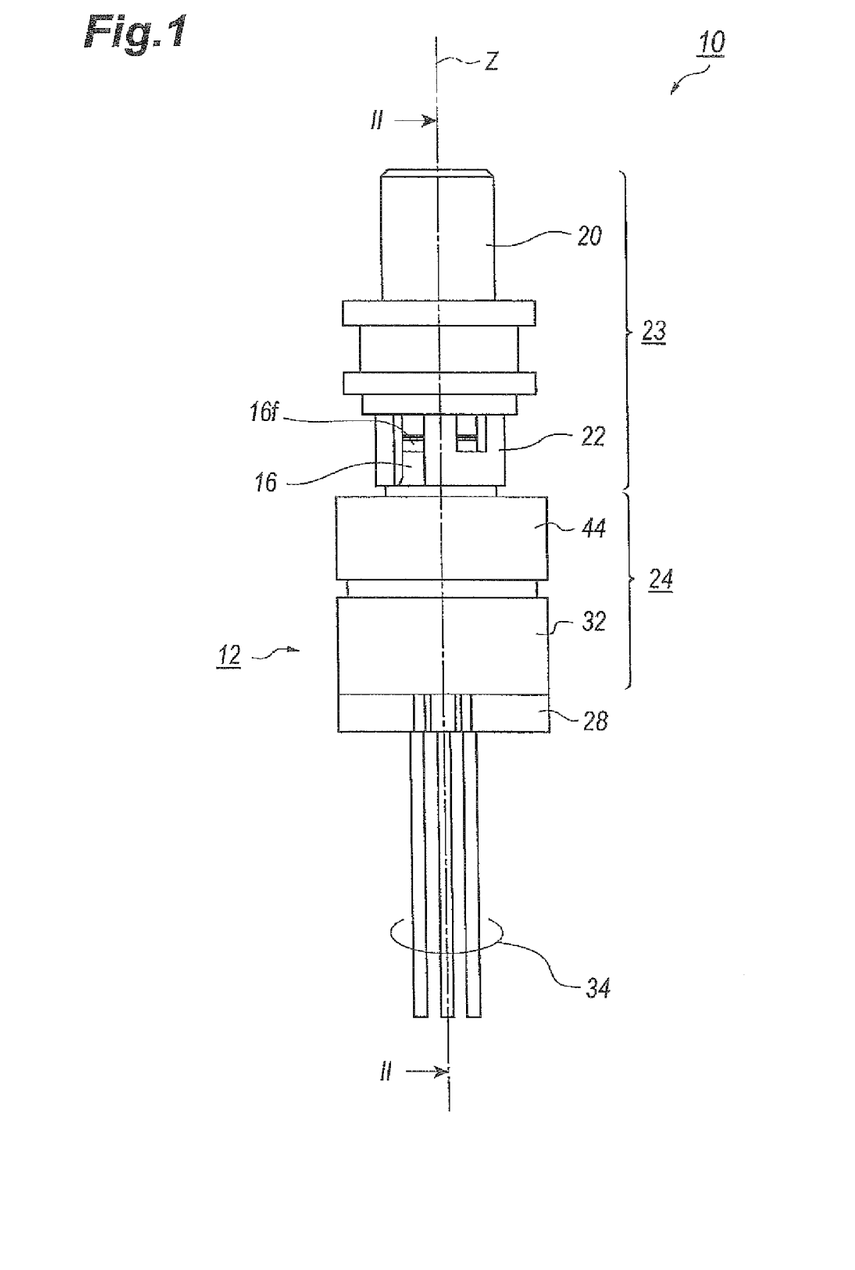
FIG. 1 is a side view showing an optical module according to an embodiment of the present application.
Figure 2:
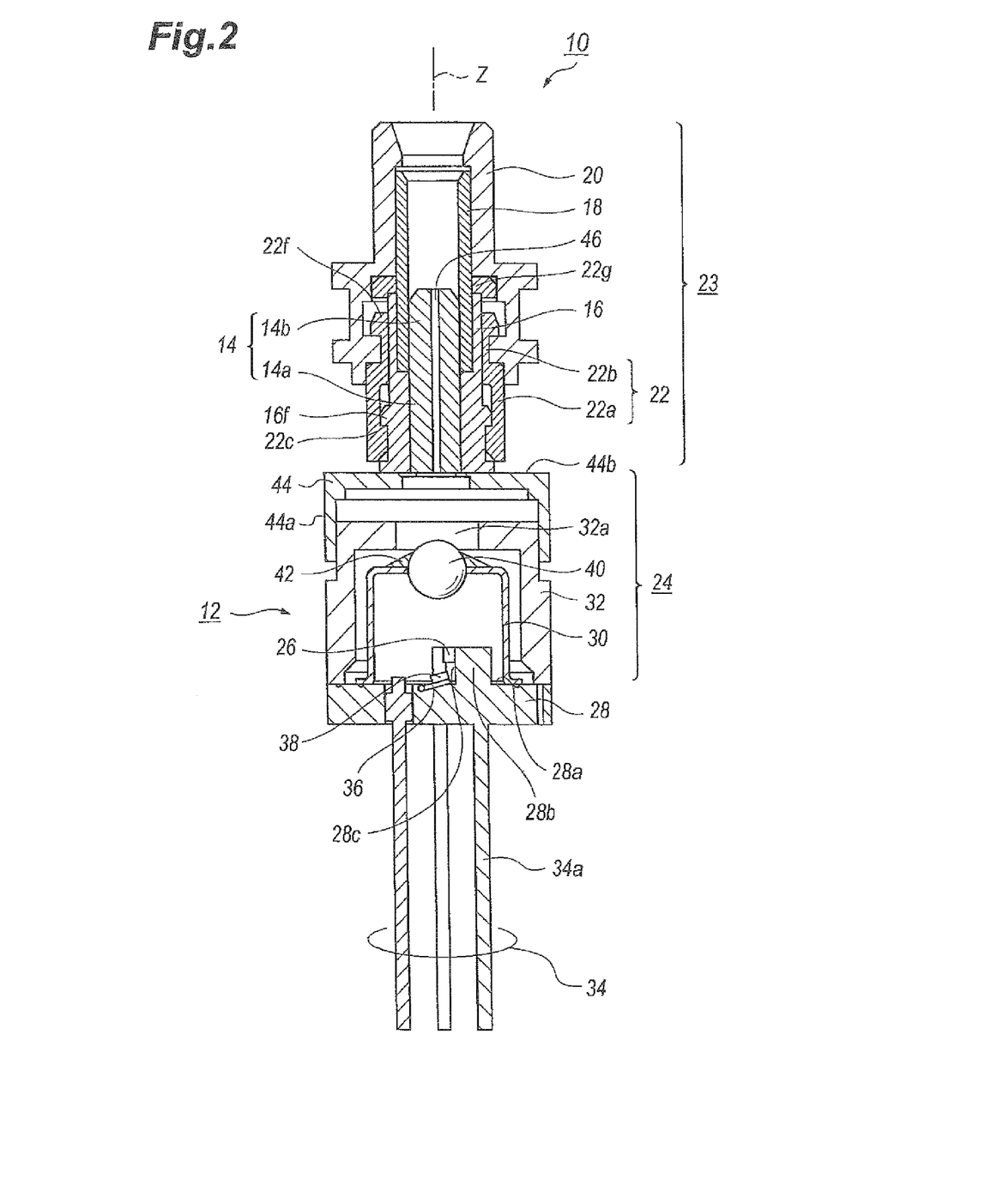
FIG. 2 shows a cross section of the optical module shown in FIG. 1, where the cross section is taken along the optical axis Z appeared in FIG. 1.

Referring to FIGS. 1 and 2 first, FIG. 1 is a side view of an optical module 10 according to an embodiment; while FIG. 2 shows a cross section of the optical module taken along the line II-II appeared in FIG. 1. The optical module 10 primarily includes an optical device 12, a jointer 24, and a coupling portion 23.

The optical device 12 provides a package with a cylindrical shape in which a semiconductor light-emitting device, typically, a semiconductor laser diode (hereafter denoted as LD) is enclosed. The package comprises a stem 28, a cap 30 with a lens 40, and a plurality of leads 34.

The stem 28, which is made of metal, for instance, stainless steel, has a disk shape. The leads 34 pass through the stem 28 and extend from one of surfaces 28a, the inner surface, of the stem 28. Some of leads 34 pass through holes provided in the stem 28. The holes are filled with sealant; that is, the leads 34 passing the holes are electrically isolated from the metal stem 28 by the sealant. At least one of leads 34, the lead 34a, is integrally formed with the stem 28 or directly and electrically connected to the stem 28, where this lead 34a is the ground lead. Also the stem 28 provides a sub-mount 28b extending from the inner surface 28a of the stem 28. The LD 26 is mounted on a side surface 28c of the sub-mount 28b, where the side surface 28c extends substantially in parallel to the optical axis Z of the optical module 10.

The LD 26, according to the present embodiment, is a type of, what is called as the edge-emitting type. Light emitted from one facet of the LD 26, which becomes signal light, is output from the optical module 10; while, light emitted from another facet opposite to the former facet is utilized as monitored light to control the operation of the LD 26. The stem 28 in the inner surface 28a thereof also provides a photodiode (hereafter denoted as PD) mounted on another sub-mount 36 for detecting the monitored light emitted from the other facet of the LD 26. An area placing this sub-mount 36 for the PD makes a substantial angle, or inclined, with respect to the optical axis Z. The PD 38 mounted on the inclined surface effectively prevents light emitted from the other facet of the LD 26 and reflected at the surface of the PD 38 from returning the LD 26.

The stem 28 also provides the cap 30 made of metal, typically Kovar, with a cylindrical shape. One ends of the cap 30 is fixed on the inner surface 28a of the stem 28, while, the other end of the cap 30, which is the ceiling thereof, has an opening in which the lens 40 is held by a sealant 42.

The jointer 24 includes a cap 32 and a cover 44, each of which is made of metal, for instance, stainless steel and has the cylindrical shape. The cap 32 in one ends thereof is fixed to the surface 28a of the stem 28 by, for instance, the YAG laser welding; while, the other end thereof provides an opening 32a to pass the light emitted from the LD 28 in the optical device 12 and condensed by the lens 40. Thus, the cap 32 fully covers the cap 30 of the optical device 12.

The cover 44 is also made of metal, typically, stainless steel and has a cylindrical shape. The cover 44 includes a skirt 44a forming a bore, into which the cap 32 is fitted, and a ceiling 44b with a flat outer surface. Adjusting an overlapping length between the cover 32 in the end thereof and the bore of the skirt 44a, the optical alignment of the optical module 10 along the optical axis Z thereof, namely, adjustment of a distance from the lens 40 and the coupling portion 23 is carried out. While, sliding the coupling portion 23 on the flat outer surface of the ceiling 44b, the optical alignment is carried out along directions perpendicular to the optical axis Z. Thus, the cover 44 is often called as a joint sleeve. The cover 44 is fixed with the cap 32 by piercing welding at several points of the skirt 44a.

The coupling portion 23 includes a stub, 14, a bush 16, a sleeve 18, a sleeve cover 20, and a latch 22, all of which have a substantially cylindrical shape. The stub 14, which is made of ceramics, secures a coupling fiber 46 in a center thereof. One end of the coupling fiber 46 couples with the LD 26 through the lens 40. The coupling fiber 46 and the stub 14 in one end thereof facing the lens 40 makes a substantial angle with respect to the optical axis Z, namely, the end surface of the coupling fiber 46 and that of the stub 14 are inclined with respect to the optical axis Z to prevent light reflected at these end surfaces from returning the LD 26. On the other hand, the other end of the coupling fiber 46 and that of the stub 14 have a convex shape, or are rounded in a semi-spherical shape. This convex surface is to be butted against a ferrule secured in an external optical connector coupled with the coupling portion 23. Thus, the ferrule of the external connector and the other end of the stub 14 and the coupling fiber 46 realize the physical contact.

Also, the stub 14 provides first and second portions, 14a and 14b, respectively, disposed along the optical axis Z. The first portion 14a is secured with the metal bush 16, typically, made of stainless steel, or the first portion 14a is inserted into a bore of the bush 16. While, the second portion 14b is inserted into the sleeve 18, or the sleeve 18 secures the second portion 14b. Assembling the coupling portion 23, the bush 16 secured with the stub 14 slides on the ceiling 44b of the cover 44 to align optically in a plane perpendicular to the optical axis Z. Accordingly, the end of the stub 14 facing the cover 44 stands back from the end of the bush 16. The bush 16 in the end thereof is fixed to the ceiling 44b by, for instance, the YAG laser welding after the alignment. Thus, the metal bush 16 is secured by the jointer 24 and electrically connected to the optical device 12 through the jointer 24.

The sleeve 18, which is made of ceramics, is a type of, what is called, the split sleeve with a slit extending in parallel to the optical axis Z. However, sleeve 18 may be a rigid sleeve without any slits and finely processed in a bore thereof depending on an outer diameter of the stub 14. The stub 14 in the second portion thereof 14b is inserted into a root portion of the bore of the sleeve 18 and secured thereby. The sleeve 18 receives an optical ferrule held in an external optical connector in a vacant portion not securing the stub 14. The external ferrule provides an optical fiber in a center thereof and this optical fiber optically couples with the coupling fiber 46 in the stub 14. Then, the optical device 12, or the LD 26 in the optical device 12 optically couples with the external fiber.

The sleeve cover 20, which is made of metal, typically, stainless steel, covers an end portion of the sleeve 18 and the bush 16. The end of the sleeve cover 20 provides a tapered opening to facilitate the insertion of the external ferrule into the sleeve 18. The optical module 10 of the present embodiment has a feature to provide, in addition to components described above, the latch 22 made of resin.

Figure 3A:
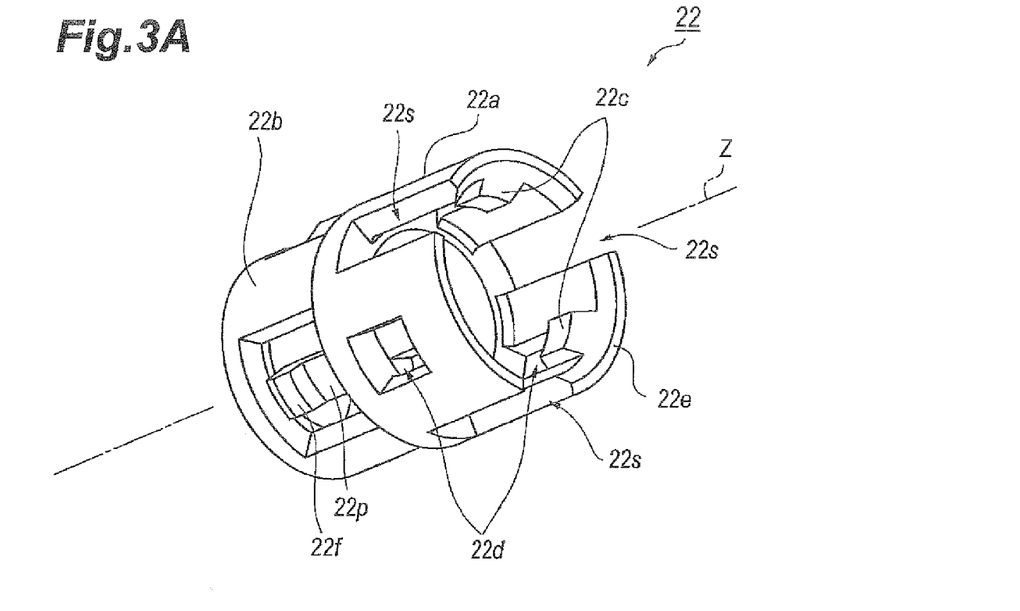
FIGS. 3A and 3B are perspective views of a latch implemented with the optical module shown in FIG. 1, where FIG. 3A views the latch from a side of an optical device; while, FIG. 3B views it from a side from which the cover is put.
Figure 3B:
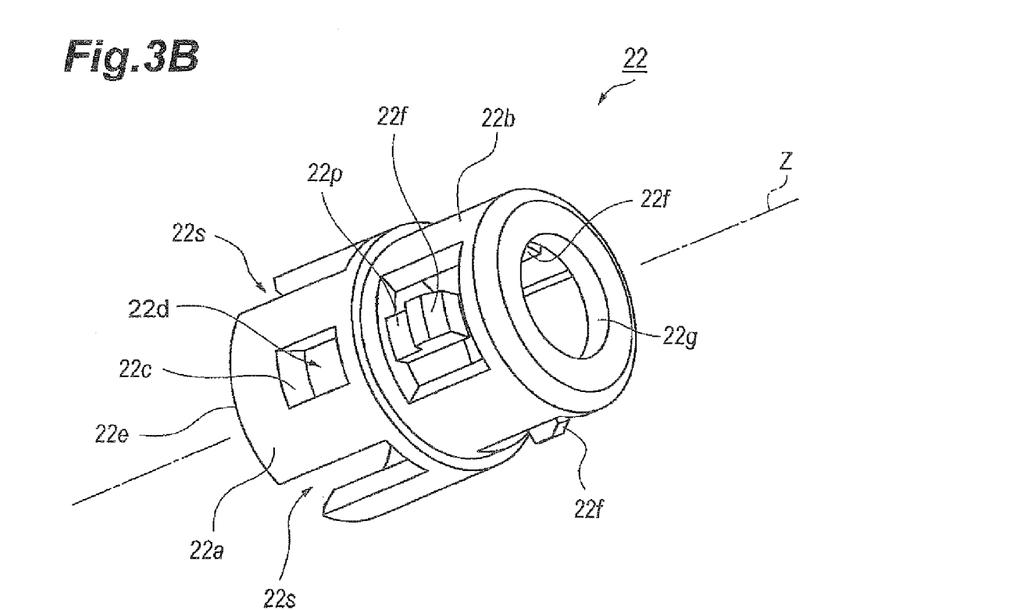

FIGS. 3A and 3B are perspective views showing details of the latch 22, where FIG. 3A views the latch 22 from a side of the optical device 12; while, FIG. 3B views the latch 22 from a side of the opening of the sleeve cover 20. The latch 22 provides first and second portions, 22a and 22b, respectively, disposed along the optical axis Z. The first portion 22a surrounds the bush 16; while, the second portion 22b is surrounded by the sleeve cover 20.

The first portion 22a is latched with the bush 16. Specifically, the first portion 22a provides a plurality of projections 22c in inner surfaces thereof extending into the bore of the first portion 22a. The embodiment shown in FIGS. 3A and 3B provides three projections 22c formed in the inner surface and evenly arranged around the optical axis Z. However, the number of projections 22c is not restricted to that of the embodiment. Projections more or less than three (3) show the same function described below.

On the other hand, the bush 16 provides a flange 16f in the outer surface thereof. Inserting the bush 16 into the bore of the first portion 22a of the latch 22, the projection 22c of the latch 22 hooks the flange 16f. Then, assembling the bush 16 with the latch 22, the bush 16 is blocked to be slip out from the latch 22.

The latch 22 of the embodiment further provides a plurality of rectangular openings 22d each disposed immediate neighbor to respective projections 22c. Specifically, the opening 22d is formed between the projection 22c and the boundary between the first portion 22a and the second portion 22b, and continuous to the projection 22e. The rectangular opening 22d provides a room for removing molds to form the projection when the latch 22 is formed by resin molding. The latch 22 further provides slits 22s. FIGS. 3A and 3B show three slits 22s formed in the first portion 22a and evenly arranged around the optical axis Z as putting the projections therebetween. The slits 22s extend in parallel to the optical axis Z from the boundary to the second portion 22b to the end 22e of the first portion 22a. Inserting the bush 16 into the bore of the first portion 22a, the first portion 22a is easily bent outwardly, which facilitates the insertion of the bush 16.

The second portion 22b is inserted into a bore of the sleeve cover 20. Further specifically, the second portion 22b is set into a space formed between the sleeve 18 and the sleeve cover 20. The second portion 22b hooks the sleeve cover 20. That is, the second portion 22b provides a plurality of posts 22p each extending from the boundary to the first portion 22a and providing a hook 22f protruding outwardly in a tip thereof. The embodiment shown in FIGS. 3A and 3B provides three posts 22p evenly arranged around the optical axis Z. Also the second portion 22b provides the inner rib 22g in the end thereof. As shown in FIG. 2, the inner rib 22g is sandwiched between the sleeve cover 20 and the bush 16.

Figure 4:
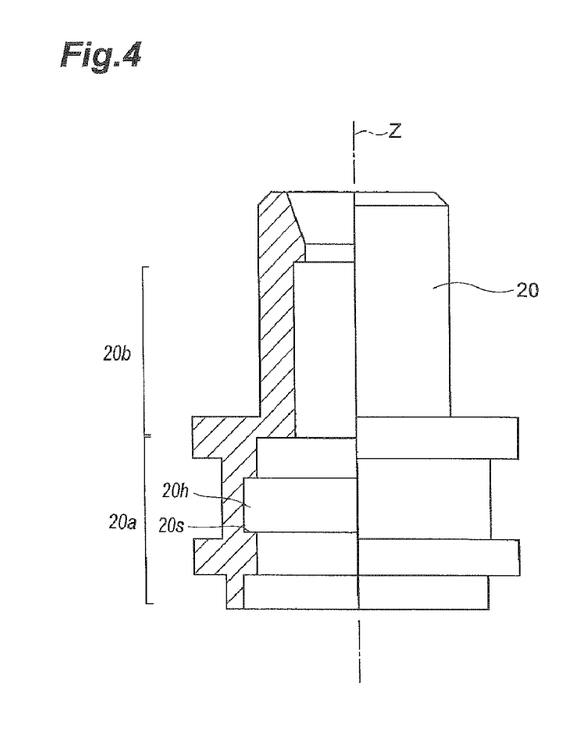
FIG. 4 is a side view of the cover, where a portion of the cover is cut away to show the cross section thereof.

FIG. 4 is a side view of the sleeve cover 20, a portion of which is cut away to show the cross section thereof. The sleeve cover 20 includes first and second portions, 20a and 20b, respectively. The first portion 20a provides a bore whose diameter is greater than that of the second portion 20b. Referring to FIG. 2, the first portion 20a receives the second portion 22b of the latch 22 and the root portion of the sleeve 18 into which the second portion of the stub 14b is fitted. On the other hand, the second portion 20b receives only the sleeve 18. The first portion 20a in the bore thereof provides an axial hollow 20h, where the post 22p in the hook 22f thereof is set therein. The hollow 20h forms a step 20s in the edge thereof, on which the hook 22f of the latch 22 is to be hooked.

Installing the optical module 10 above described in an optical transceiver, the jointer 24 and the optical device 12 are connected to the signal ground of the optical transceiver; while, the sleeve cover 20 is electrically connected to the frame ground, or the chassis ground. Because the latch 22 is made of resin, namely, electrically insulating material, the latch 22 isolates the signal ground of the jointer 24, or the bush 16 in the coupling portion 23 from the frame ground of the sleeve cover 20. In an electronic apparatus not restricted to an optical transceiver, the signal ground is usually isolated from the frame ground, because the frame ground or the outermost case is exposed in ambient radiation conditions. Many electro-magnetic interference (EMI) noises radiate in the environment. When an electronic apparatus has the signal ground common to the frame ground, such radiation noises easily penetrate into the apparatus through the ground. The optical module 10 of the embodiment effectively prevents such penetration of the EMI noise because the latch 22 made of electrically insulating material isolates the signal ground from the frame ground or the chassis ground.

Figure 5:
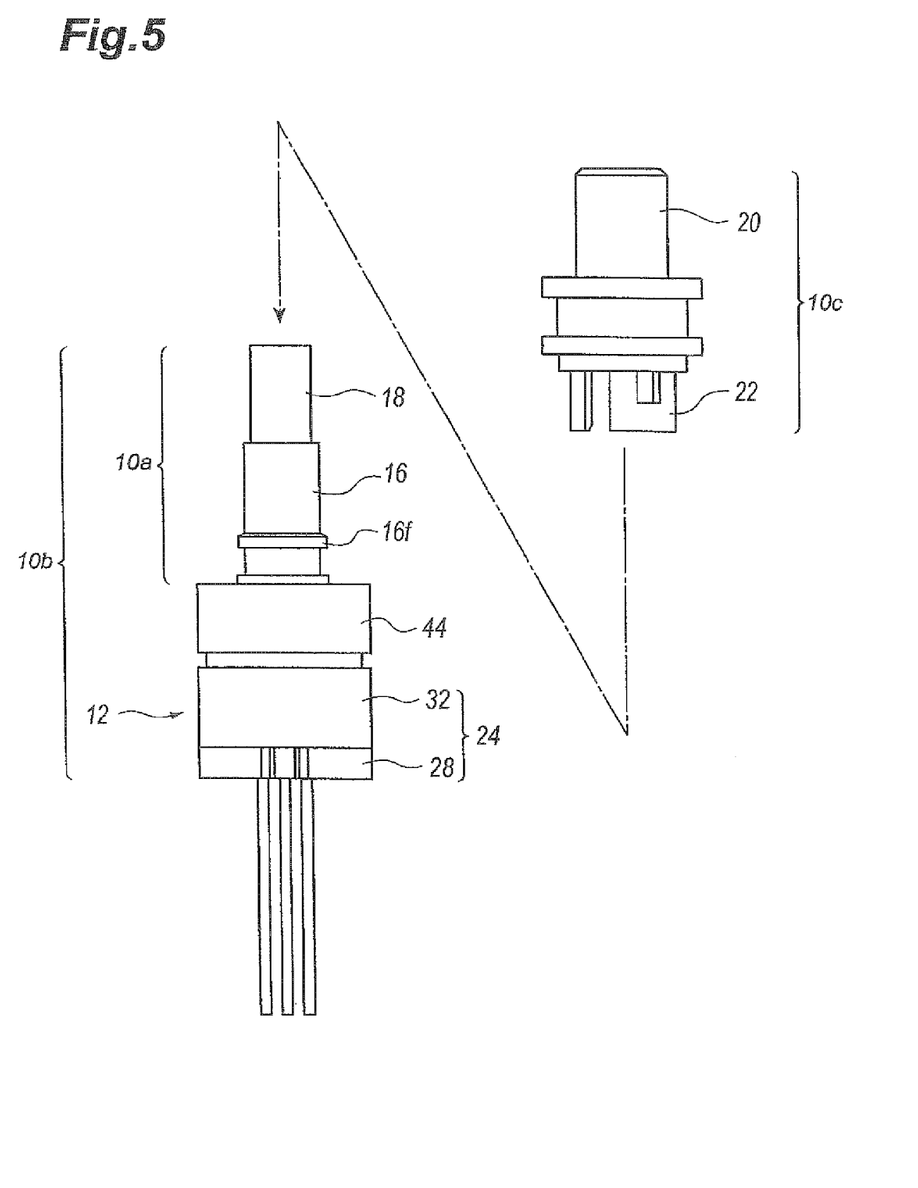
FIG. 5 shows a process to assemble the optical module shown in FIG. 1.

Next, referring to FIG. 5, a method to assemble the optical module 10 according to an embodiment of the invention will be described. The assembly of the optical module 10 first prepares an intermediate product 10a including the stub 14, the sleeve 18, and the bush 16, where the stub 14 in the first portion 14a thereof is inserted into the bush 16, while, in the second portion 14b thereof is received by the sleeve 18. Next, adjusting the penetration depth of the cap 32 in the bore of the skirt 44a of the cover 44, and sliding the root flange of bush 16 on the ceiling 44b of the cover 44, the optical alignment between the coupling portion 23 and the optical device 12, namely, the LD 26 in the optical device 12 is carried out, where the former adjustment corresponds to the Z-alignment and the latter corresponds to the XY alignment. After the optical alignment, the root flange of the bush 16 is welded to the ceiling 44b, while, the skirt 44a is welded to the cap 32, which completes the second intermediate assembly 10b.

Concurrently with the assembly of the second intermediate assembly 10b, another intermediate assemble 10c is prepared independent of the second assembly 10b by inserting the second portion 22b of the latch 22 into the bore of the sleeve cover 20. Then, the top portion of the second intermediate assembly 10b is inserted into the bore of the first portion 22a of the latch 22. Thus, the optical module 10 shown in FIG. 1 is completed.

In the optical module 10, the first portion 22a of the latch 22 hooks the flange 16f of the bush 16; while, the second portion 22b thereof is hooked with the sleeve cover 20. Thus, the bush 16 and the sleeve cover 20 are assembled with each other through the latch 22 provided therebetween. Moreover, the latch 22 is made of electrically insulating material; accordingly, even when the bush 16 and the sleeve cover 20 are made of metal, the signal ground electrically connected to the bush 16 and the frame or chassis ground electrically connected to the sleeve cover 20 are electrically isolated from each other.

Figure 6:
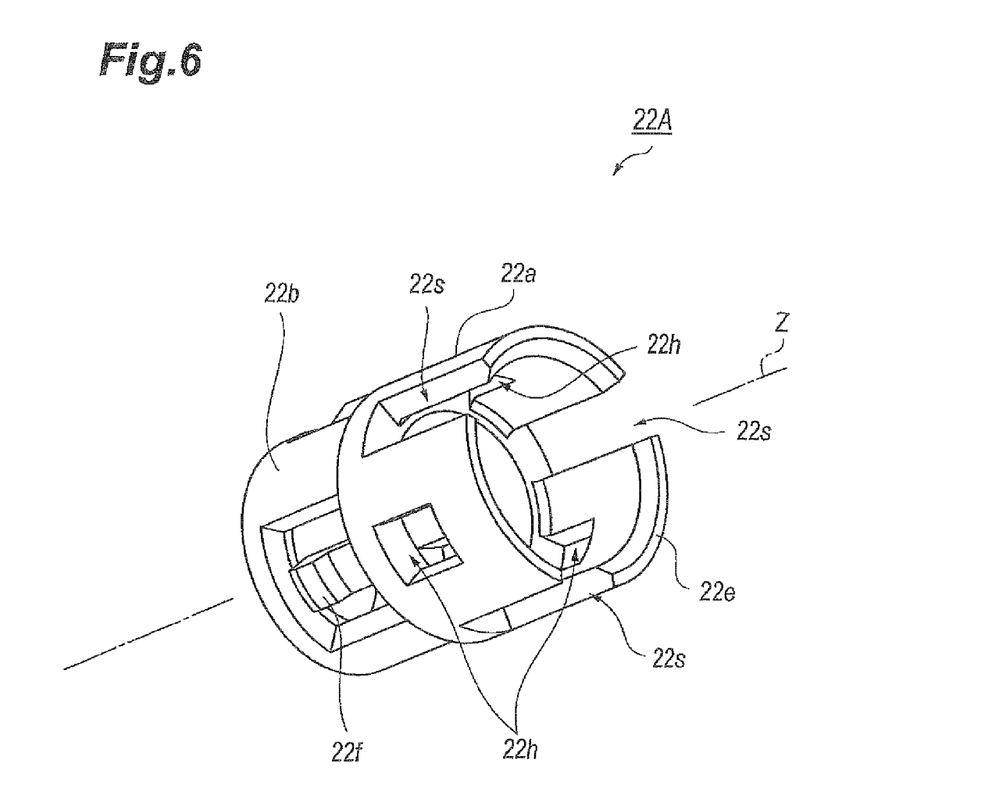
FIG. 6 is a perspective view showing another latch modified from the aforementioned latch shown in FIG. 2.
Figure 7:
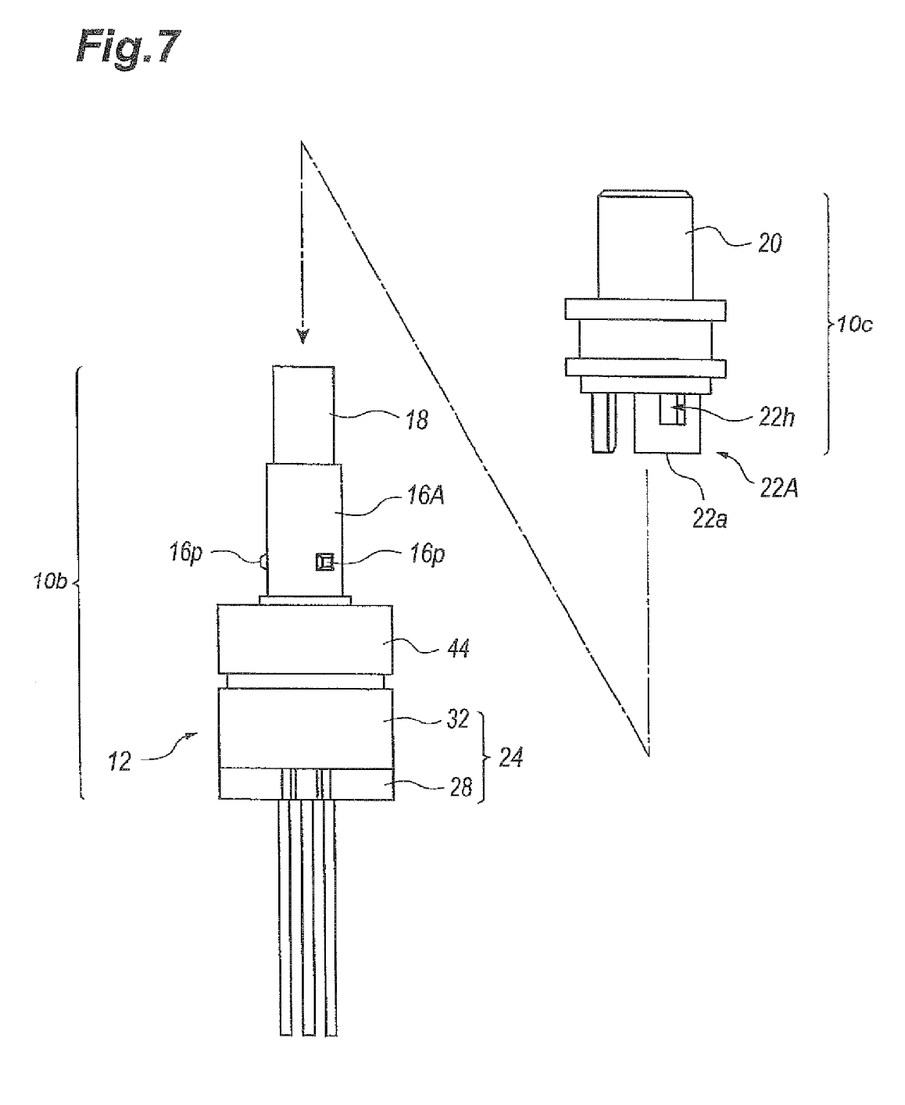
FIG. 7 shows a modified process to assemble the optical module implemented with the latch shown in FIG. 6.

FIG. 6 is a perspective view showing another latch 22A according to a modified embodiment, and FIG. 7 shows a process to assemble the optical module 10A implementing with this latch 22A. The modified latch 22A shown in FIG. 6 provides only the openings 22h but omits the projections 22c prepared in the latch 22 with a basic structure shown in FIGS. 3A and 3B. On the other hand, the bush 16A omits the flange 16f but provides the projections 16p in positions of the outer surface thereof around the optical axis Z. The projections 16p of the bush 16 mate with the openings 22h of the latch 22A when the intermediate product 10c is assembled with the other intermediate product 10b.

Figure 8A:
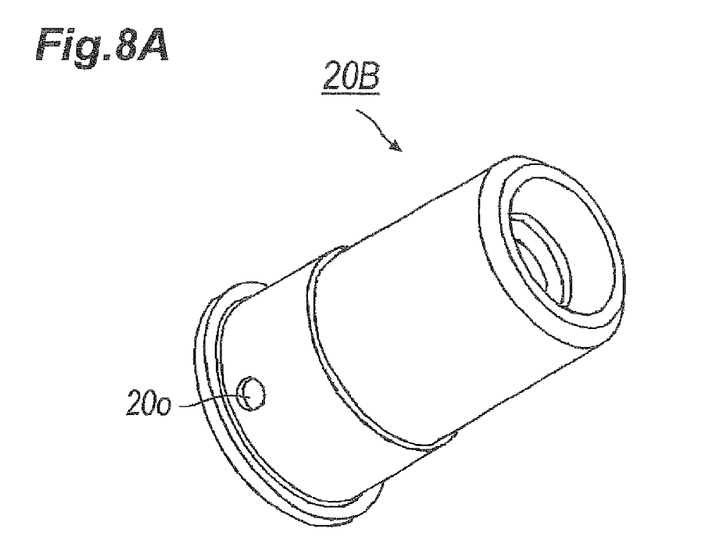
FIGS. 8A and 8B are perspective views showing modified cover and latch.
Figure 8B:
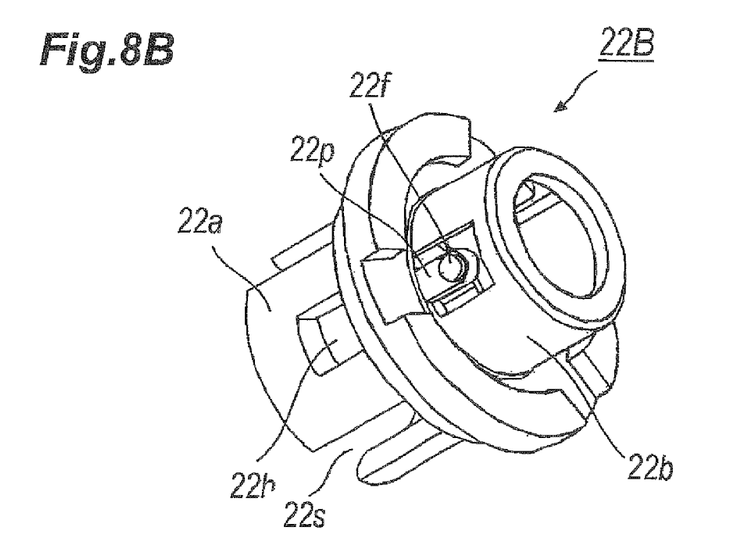
Figure 9:
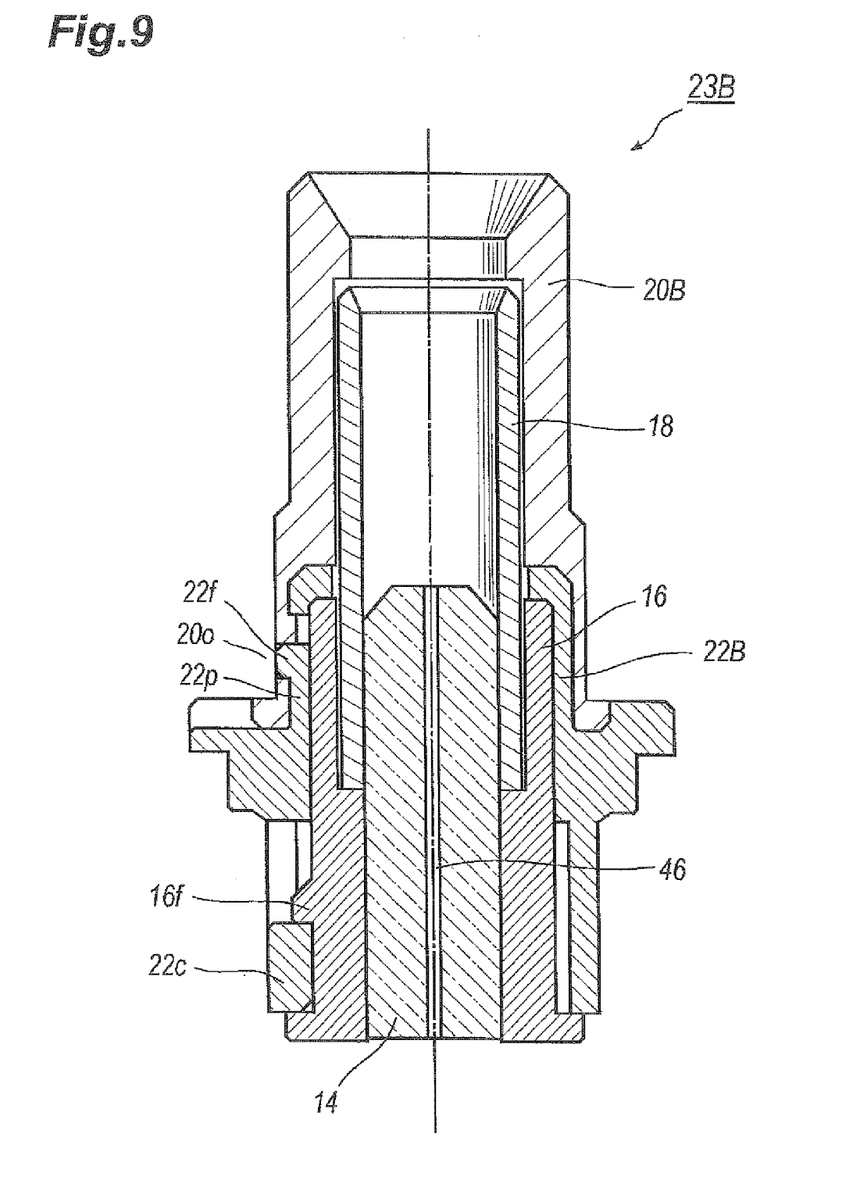
FIG. 9 shows a cross section of the optical coupling portion implemented with the modified cover and latch shown in FIGS. 8A and 8B.

FIGS. 8A and 8B are still another modification of the optical module 10B, and FIG. 9 shows a cross section taken along the optical axis Z thereof. The modified optical module 10B provides another sleeve cover 20B and another latch 22B. The sleeve cover 20B of the modified embodiment provides a plurality of holes 20o arranged around the optical axis Z but omits the steps 20s formed by the axial hollow 20h. The holes 20o have a circular shape. On the other hand, the modified latch 22B also provides the hook 22f but the shape thereof is circular. The sleeve cover 20B is assembled with the latch 22B by hooking the circular hook 22f with the circular holes 20o.

FIG. 9 shows a cross section of modified sleeve cover 20B hooked with the latch 22B each shown in FIGS. 8A and 8B. As described above, the sleeve cover 20B has not any step 20s in the inner hollow 20k it is difficult to from structures within bore, in particular, a structure like the hollow 20h with a wider diameter compared with an inlet diameter of the bore. The cover, 20 or 20B, is made of metal, typically stainless steel, in the present embodiment. Such inner structures are necessary to be processed by lathing or casting. Because the bore of the sleeve 20B has a diameter of only a few millimeters, the lathing is extremely complex. For the casting, specific structures are necessary to remove the casting die whose diameter gradually increases as closing the tip end thereof. Moreover, the latch 22 once fitted with the sleeve cover 20 is impossible to detach therefrom without breaking the latch 22. The embodiment shown in FIGS. 8A to 9 provides the hook 22f shaped into the circular button and the sleeve cover 20B with the circular holes 20o without any specific structure in the bore thereof; accordingly, the process to form the sleeve cover 20B becomes far simplified.

While particular embodiments of the present invention have been described herein for purposes of illustration, many modifications and changes will become apparent to those skilled in the art. For instance, the optical module 10 is the type of the light-emitting module implemented with the LD 26. However, the mechanism of the bush 16, the latch 22 and the sleeve cover 20 is applicable to other types of the optical module such as the light-receiving module implemented with a photodiode instead of the LD 26. Accordingly, the appended claims are intended to encompass all such modifications and changes as fall within the true spirit and scope of this invention.

The invention claimed is:

1. An optical module having an optical axis, comprising:
an optical device;
a stub that secures a coupling fiber optically coupled with the optical device, the stub having a first portion and a second portion disposed along the optical axis;
a metal bush having a first portion and a second portion disposed along the optical axis, the first portion of the metal bush receiving the first portion of the stub;
a sleeve inserted between the second portion of the stub and the second portion of the metal bush;
a metal sleeve cover that covers the sleeve and the second portion of the metal bush; and
a latch made of electrically insulating material and inserted between the metal bush and the metal sleeve cover thereby electrically isolating the metal sleeve cover from the metal bush, the latch having a first portion and a second portion disposed along the optical axis, the first portion of the latch being hooked with the metal bush and the second portion of the latch being hooked with the metal sleeve cover,
wherein the metal sleeve cover exposes the first portion of the latch.

2. The optical module of claim 1,
wherein the first portion of the metal bush has a flange in an outer surface thereof, and the first portion of the latch has a projection in an inner surface thereof, the projection of the latch being hooked with the flange of the metal bush.

3. The optical module of claim 1,
wherein the first portion of the metal bush has a projection in an outer surface thereof and the first portion of the latch has an opening, the projection of the metal bush being hooked with the opening of the latch.

4. The optical module of claim 1,
wherein the second portion of the latch provides a hook and the metal sleeve cover provides a step in an inner surface thereof, the hook of the latch being hooked with the step.

5. The optical module of claim 4,
wherein the latch in the second portion thereof further provides a post extending along the optical axis from a boundary between the first portion of the latch and the second portion of the latch, and
wherein the hook is provided in an end of the post and protrudes outwardly.

6. The optical module of claim 1,
wherein the second portion of the latch provides a hook and the metal sleeve cover provides a hole to which the hook of the latch is hooked.

7. The optical module of claim 1,
wherein the first portion of the latch provides a slit extending along the optical axis, the first portion of the latch being radially expandable.

8. An optical module having an optical axis and being installed within an optical transceiver, comprising:
an optical device that installs a laser diode therein, the optical device having a metal package;
a jointer having a metal cap and a cover, the metal cap covering the metal package and the metal cap including a ceiling and a skirt, the skirt receiving the metal cap therein; and
a coupling portion including,
a stub having a coupling fiber optically coupled with the laser diode in the optical device,
a metal bush having a first portion and a second portion disposed along the optical axis, the first portion supporting the stub, the metal bush being electrically connected with the metal package of the optical device,
a sleeve having a first portion and a second portion disposed along the optical axis, the first portion of the sleeve being inserted between the second portion of the stub and the second portion of the metal bush, the second portion of the sleeve receiving an external ferrule that optically couples with the coupling fiber in the stub,
a metal sleeve cover that covers the sleeve and the second portion of the metal bush, the metal sleeve cover being made of electrically conductive material, and
a latch made of electrically insulating material and inserted between the metal bush and the metal sleeve cover thereby electrically isolating the metal sleeve cover from the metal bush, the latch including a first portion and a second portion disposed along the optical axis, the first portion of the latch being hooked with the first portion of the metal bush and the second portion of the latch being hooked with the metal sleeve cover,
wherein the metal sleeve cover exposes the first portion of the latch.

9. The optical module of claim 8,
wherein the first portion of the metal bush provides a flange in an outer surface thereof, and the first portion of the latch provides a hook in an inner surface of the first portion thereof, and
wherein the hook of the latch is hooked with the flange of the metal bush.

10. The optical module of claim 8,
wherein the first portion of the metal bush provides a projection in an outer surface thereof, and the first portion of the latch provides an opening, and
wherein the projection of the metal bush is hooked with the opening of the latch.

11. The optical module of claim 8,
wherein the second portion of the latch provides a hook, and the metal sleeve cover provides a step in an inner surface thereof, and
wherein the hook of the latch is hooked with the step of the metal sleeve cover.

12. The optical module of claim 11,
wherein the latch provides a post with the hook in an end thereof.

13. The optical module of claim 8,
wherein the second portion of the latch provides a hook and the metal sleeve cover provides a hole, and
wherein the hook of the latch is hooked with the hole of the metal sleeve cover.

14. The optical module of claim 13,
wherein the second portion of the latch further provides a post extending along the optical axis from a boundary between the first portion of the latch and the second portion of the latch, and
wherein the hook is provided in an end of the post and protrudes outwardly.

15. The optical module of claim 8, wherein the first portion of the latch provides a slit extending along the optical axis, the first portion of the latch being radially expandable.

* * * * *